United States Patent [19]

Voigt

[11] Patent Number: 5,383,705
[45] Date of Patent: Jan. 24, 1995

[54] SHOCK ABSORBING SEAT

[76] Inventor: Bernard Voigt, 15 High St., Hicksville, N.Y. 11801

[21] Appl. No.: 867,382

[22] Filed: Apr. 13, 1992

[51] Int. Cl.⁶ .............................................. B62J 1/02
[52] U.S. Cl. ................................ 297/211; 297/195.1; 248/622; 188/298
[58] Field of Search ........ 297/195, 204, 205, 208–211, 297/214, 195.1; 248/599, 600, 620, 622; 188/298

[56] References Cited

U.S. PATENT DOCUMENTS

| | | | |
|---|---|---|---|
| 975,827 | 11/1910 | Busch | 297/208 X |
| 979,032 | 12/1910 | Pierce | 297/211 |
| 1,130,316 | 3/1915 | Mesinger | 297/211 |
| 1,229,468 | 6/1917 | Jackson | 297/211 |
| 2,467,676 | 4/1949 | Labine | 297/211 |
| 4,456,295 | 6/1984 | Francu | 297/195 X |

Primary Examiner—Kenneth J. Dorner
Assistant Examiner—Milton Nelson, Jr.
Attorney, Agent, or Firm—Michael I. Kroll

[57] ABSTRACT

An improved shock absorbing bicycle seat is provided for a pedal/motor power driven vehicle, such as typically but not limited to, a bicycle frame having a seat tube and wheels which consists of a seat assembly. A mechanism is located between the seat assembly and the seat tube on the bicycle frame, for absorbing impulsive forces generated by the wheels making contact with an irregular road surface. The impulsive forces will be assimilated by the absorbing mechanism before reaching the seat assembly to give a rider a smoother and softer ride.

4 Claims, 3 Drawing Sheets

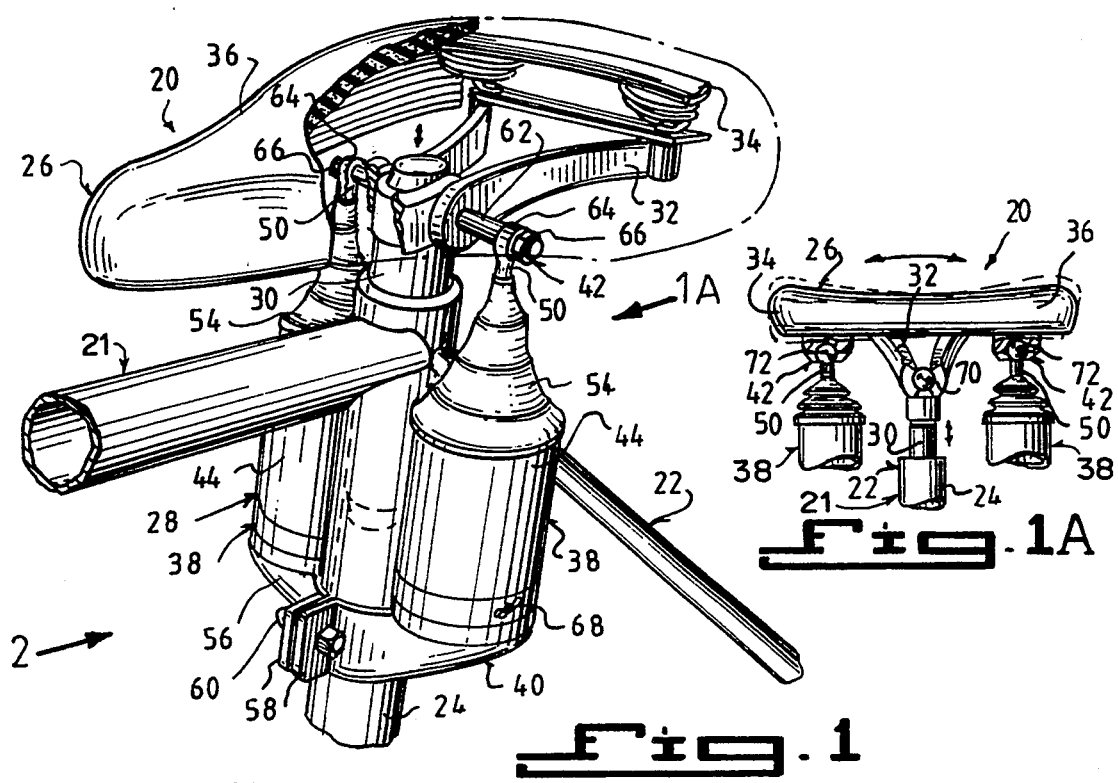
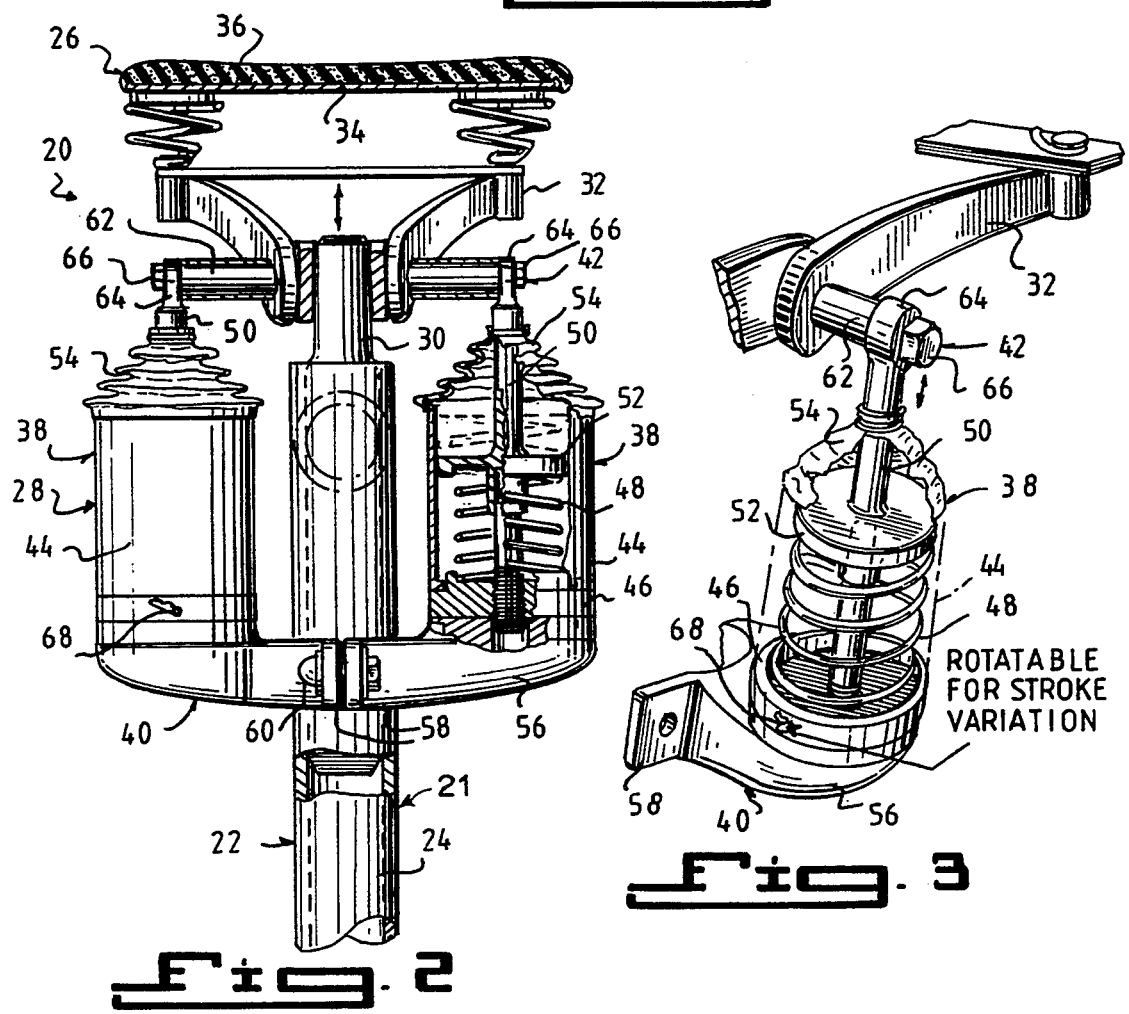

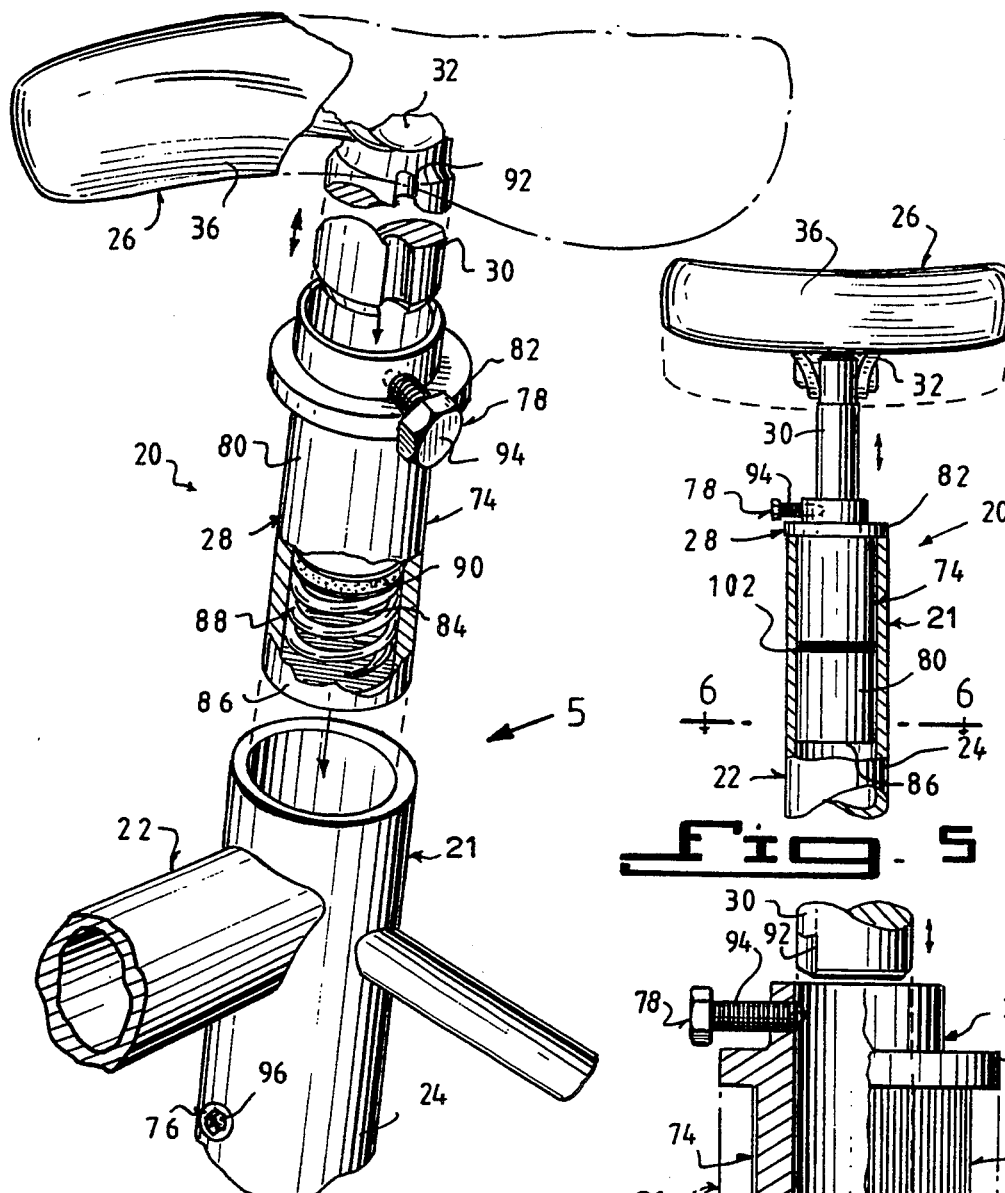
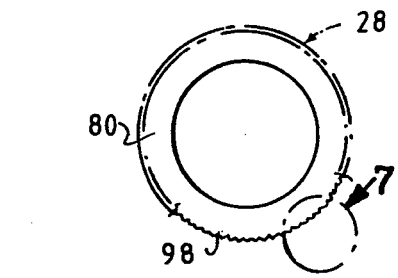
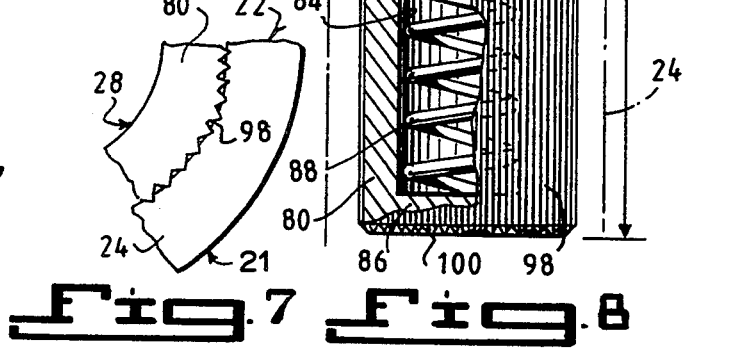

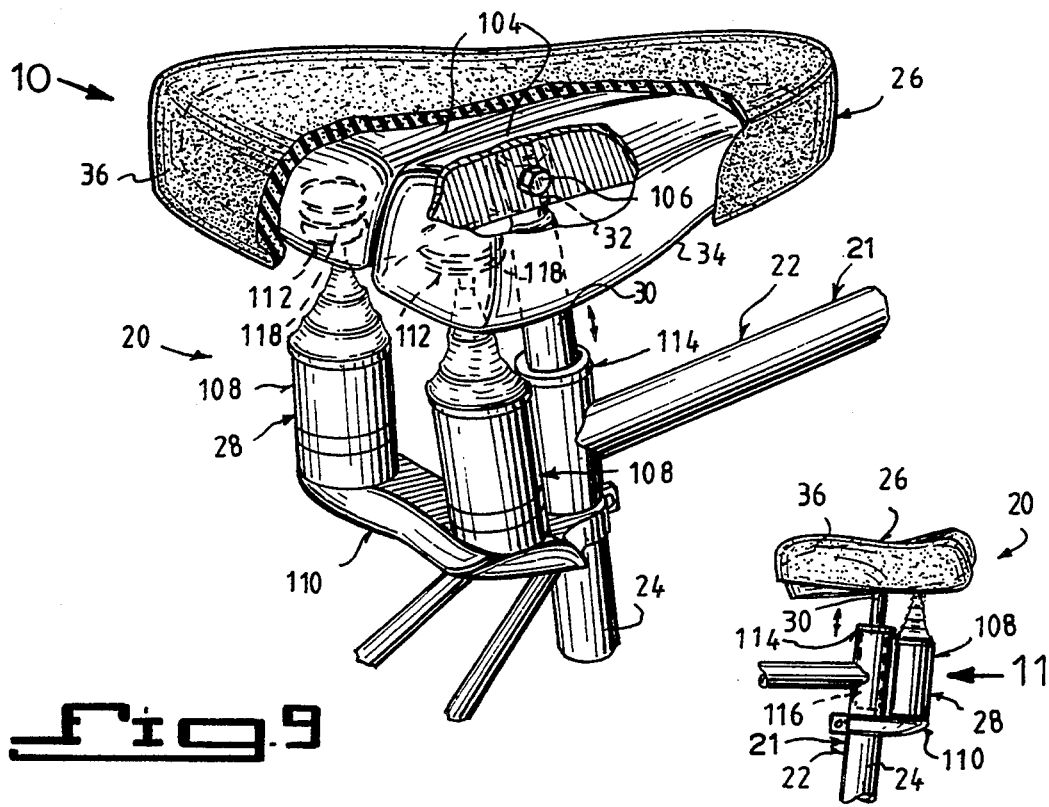
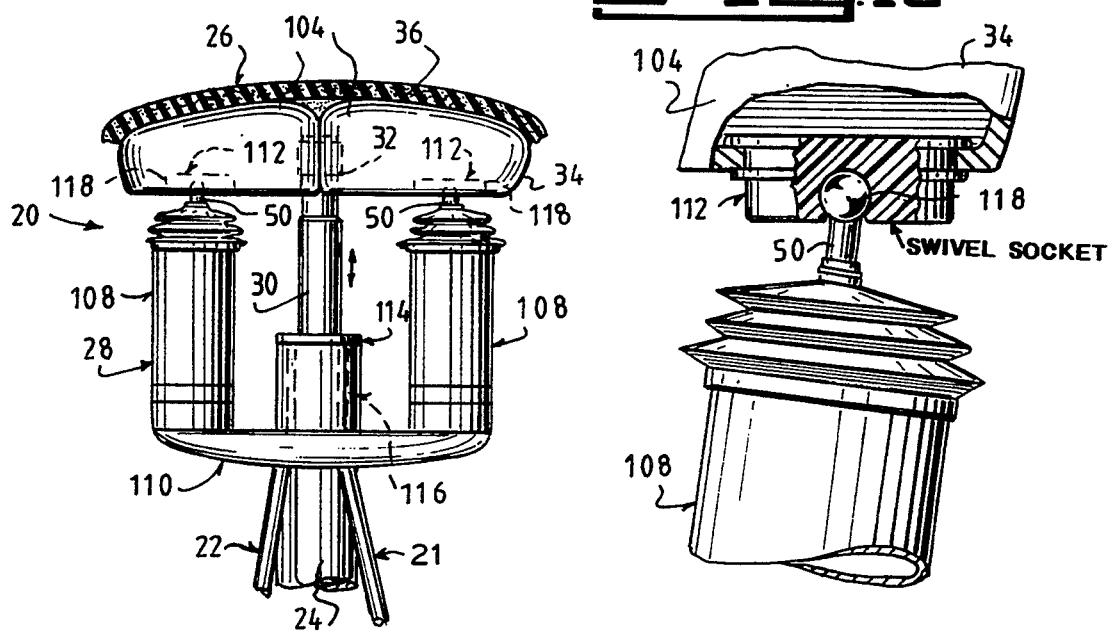

SHOCK ABSORBING SEAT

BACKGROUND OF THE INVENTION

1. Field of the Invention

The instant invention relates generally to cycled vehicles and more specifically it relates to an improved shock absorbing seat for a pedal/motor power driven vehicle.

2. Description of the Prior Art

Numerous cycled vehicles have been provided in prior art that are adapted to come equipped with seats that contain spring biased support structures which try to enhance the comfort of the riders of the cycled vehicles. While these units may be suitable for the particular purpose to which they address, they would not be as suitable for the purposes of the present invention as heretofore described.

SUMMARY OF THE INVENTION

A primary object of the present invention is to provide an improved shock absorbing seat for a pedal/motor power driven vehicle that will overcome the shortcomings of the prior art devices.

Another object is to provide an improved shock absorbing seat that will give a rider a smoother and softer ride by lessening shocks received to the vehicle frame due to poor road conditions and or lengthy rides.

An additional object is to provide an improved shock absorbing seat that can be quickly installed without the use of special tools and can be disconnected and transferred to another vehicle of the same size without any trouble.

A further object is to provide an improved shock absorbing seat that is simple and easy to use.

A still further object is to provide an improved shock absorbing seat that is economical in cost to the manufacturer, retailer and consumer.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view with parts broken away and in section of a portion of a bicycle frame and a dual shock system of the instant invention installed thereon.

FIG. 1A is a rear view taken in direction of arrow 1A in FIG. 1 showing a modified dual shock system.

FIG. 2 is a front view with parts broken away and in section taken in direction of arrow 2 in FIG. 1.

FIG. 3 is a perspective view with parts broken away and in section showing the internal structure of one of the shock absorbers.

FIG. 4 is an exploded perspective view with parts broken away and in section of a bicycle frame with a single shock system of the instant invention ready to be installed thereon.

FIG. 5 is a rear view with parts broken away and in section taken in direction of arrow 5 in FIG. 4 showing all the parts assembled together and the shock absorber housing being adjustable.

FIG. 6 is a diagrammatic cross sectional view taken along line 6—6 in FIG. 5 of just the adjustable shock absorber housing having a knurled external surface.

FIG. 7 is an enlarged diagrammatic cross sectional view as indicated by arrow 7 in FIG. 6 showing the knurled external surface of the housing in engagement within the seat tube of the bicycle frame.

FIG. 8 is an elevational view with parts broken away and in section of the shock absorber with the housing as indicated in FIG. 6 and the seat post ready to be installed therein.

FIG. 9 is a perspective view with parts broken away and in section of a bicycle frame with a compound shock system of the instant invention installed thereon.

FIG. 10 is a side view taken in direction of arrow 10 in FIG. 9.

FIG. 11 is a rear view taken in direction of arrow 11 in FIG. 10 with the padded cover broken away and in section.

FIG. 12 is an enlarged elevational view with parts broken away and in section showing the TEFLON (trademark for non-stick coating) swivel socket for one of the external shock absorbers in greater detail.

DETAILED DESCRIPTION OF THE PREFERRED EMBODIMENTS

Turning now descriptively to the drawings, in which similar reference characters denote similar elements throughout the several views, the Figures illustrate an improved shock absorbing seat 20 for a pedal/motor power driven vehicle 21, such as typically but not limited to, a bicycle frame 22 having a seat tube 24 and wheels (not shown). The improved shock absorbing seat 20 consists of a seat assembly 26 and a mechanism 28 located between the seat assembly 26 the seat tube 24 on the bicycle frame 22, for absorbing impulsive forces generated by the wheels making contact with an irregular road surface. The impulsive forces will be assimilated by the absorbing mechanism 28 before reaching the seat assembly 26 to give a rider a smoother and softer ride.

The seat assembly 26 includes a seat post 30, with a support structure 32 connected to an upper end of the seat post 30. A saddle 34 is carried on the support structure 32 and a padded cover 36 fits over the saddle 34.

The absorbing mechanism 28, as shown in FIGS. 1, 2 and 3, contains a pair of external shock absorbers 38, with an apparatus 40 for mounting the external shock absorbers 38 to the seat tube 24 on the bicycle frame 22. A device 42 is for coupling the external shock absorbers 38 to the seat assembly 26, so that the seat post 30 can slide within the seat tube 24 on the bicycle frame 22. Each external shock absorber 38 consists of a cylindrical housing 44 positioned vertically on said mounting apparatus 40 adjacent the seat tube 24. A lower disc shaped retainer 46 is carried in the housing 44, so that a coil spring 48 can sit upon the lower retainer 46. A telescopic shaft 50 extends upwardly from the center of the lower retainer 46 through the coil spring 48 and above the housing 44. An upper disc-shaped retainer 52 is affixed to the telescopic shaft 50 which fits over the coil spring 48. A cone-shaped bellows cover 54 is attached between the top of the housing 44 and the telescopic shaft 50, to protect the telescopic shaft 50 from weather elements, such as snow, ice, rain and/or debris.

The mounting apparatus 40 includes a bracket clamp 56 having a split lug 58, so that the bracket clamp 56 can fit about the seat tube 24 on the bicycle frame 22 and support the external shock absorbers 38 thereon. A fasteners 60 extends through the split lug 58 on the bracket clamp 56 for securing the bracket clamp to the seat tube 24.

The coupling device 42 contains an elongated rod 62 extending transversely through the upper end of the seat post 30 and the support structure 32 in the seat assembly 26. An eyelet 64 is formed on a top end of each telescopic shaft 50. A pair of bolts 66 are provided with each extending through one of the eyelets 64 and threaded into an end of the elongated rod 62. A mechanism 68 is for adjusting the distance of the lower disc shaped retainer 46 from the upper disc shaped retainer 52 to selectively vary the stroke action of the telescopic shaft 50 with respect to the coil spring 48.

As shown in FIG. 1A, a swivel ball socket 70 is located between the upper end of the seat post 30 and the support structure 32 in the seat assembly 26. The coupling device is a pair of TEFLON swivel ball sockets 72, each located between the top end of the telescopic shaft 50 in one external shock absorber 38 and the saddle 34 in the seat assembly 26, to allow the saddle 34 to swivel from side to side.

The absorbing mechanism 28, as shown in FIGS. 4, 5 and 8 contains an internal shock absorber 74, with an apparatus 76 for mounting the internal shock absorber 74 into the seat tube 24 on the bicycle frame 22, so that the seat post 30 will slide within the internal shock absorber 74. A device 78 is for coupling the internal shock absorber 74 to the seat assembly 26.

The internal shock absorber 74 consists of a cylindrical housing 80 having a collar 82 and a bore 84 therein terminating at a bottom wall 86. The housing 80 is sized to fit into the seat tube 24 up to the collar 82. A coil spring 88 fits into the housing 80 and sits upon the bottom wall 86. A disc-shaped cushion 90 fits over the coil spring 88 within the housing 80, so that the bottom end of the seat post 30 can contact the cushion 90.

The coupling device 78 includes the seat post 30 having an elongated longitudinal groove 92 therein. A guide bolt 94 is threaded through the housing 80 above the collar 82, so that when the seat post 30 is inserted within the bore 84 of the housing 80, the guide bolt 94 will prevent the seat post 30 from rotating when sliding therein.

As shown in FIG. 4, the mounting apparatus 76 is a set screw 96 threaded through the seat tube 24 on the bicycle frame 12 to bear against the housing 80 of the internal shock absorber 74.

The mounting apparatus 76, shown in FIGS. 6, 7 and 8, includes the housing 80 having a knurled external surface 98 and an external tapered bottom edge 100, so that the housing 80 can be force fit into the seat tube 24 with the knurled external surface 98 securing the housing 80 therein. A mechanism 102 is for adjusting the length of the housing 80 to selectively vary the stroke action of the seat post 30 against the cushion 90 with respect to the coil spring 88.

In FIGS. 9, 10 and 11, the saddle 34 is longitudinally split into two pieces 104, in which the padded cover 36 fits over the saddle pieces 104. A bolt 106 is threaded through the two saddle pieces 104, the support structure 32 and the upper end of the seat post 30 to allow the two saddle pieces 104 to slightly rock independently forward and backward.

The absorbing mechanism 28 contains a pair of external shock absorbers 108, an apparatus 110 for mounting the external shock absorbers 108 to the seat tube 24 on the bicycle frame 22 and a device 112 for coupling the external shock absorbers 108 to the seat assembly 26. An internal shock absorber 114 and an apparatus 116 is for mounting the internal shock absorber 114 into the seat tube 24 on the bicycle frame 22, so that the seat post 30 will slide within the internal shock absorber 114.

Each external shock absorber 108 is identical in structure with the external shock absorber 38 shown in FIGS. 1, 2 and 3. The mounting apparatus 110 is identical in structure with the mounting apparatus 40, also shown in FIGS. 1, 2 and 3.

The coupling device 112 for the external shock absorbers 108 is a pair of TEFLON swivel ball sockets 118, each located between the top end of the telescopic shaft 50 in one external shock absorber 108 and one saddle piece 104 in the seat assembly 26. The internal shock absorber 114 is identical to the internal shock absorber 74 as shown in FIGS. 4, 5 and 8. The mounting apparatus 116 for the internal shock absorber 114 is identical to the mounting apparatus 76 shown in FIGS. 6, 7 and 8.

The pedal/motor power driven vehicle 21 shown in the drawings, is a bicycle frame 22 having a seat tube 24. The improved shock absorbing seat 20 can also be applied to tricycles, mopeds, scooters, motorcycles and certain farm vehicles. Various types of shock absorbing mechanisms 28 can also be used in conjunction with the seat assembly 26, such as gas, air, viscous, spring, water and gel shock absorbers.

LIST OF REFERENCE NUMBERS 20 improved shock absorbing bicycle seat
21 pedal/motor power driven vehicle
22 bicycle frame
24 seat tube
26 seat assembly
28 absorbing mechanism
30 seat post
32 support structure
34 saddle
36 padded cover
38 external shock absorber
40 mounting apparatus for 38
42 coupling device for 38
44 cylindrical housing for 38
46 lower disc-shaped retainer
48 coil spring
50 telescopic shaft
52 upper disc-shaped retainer
54 cone-shaped bellows cover
56 bracket clamp
58 split lug
60 fastener
62 elongated rod
64 eyelet
66 bolt
68 adjusting mechanism for 46
70 swivel ball socket
72 TEFLON swivel ball socket
74 internal shock absorber
76 mounting apparatus for 74
78 coupling device for 74
80 cylindrical housing for 74
82 collar on 80
84 bore in 80

86 bottom wall on 80
88 coil spring
90 disc-shaped cushion
92 elongated longitudinal groove in 30
94 guide bolt
96 set screw for 76
98 knurled external surface on 80 100 external tapered bottom edge on 80
102 adjusting mechanism for 80
104 saddle piece for 34
106 bolt
108 external shock absorber
110 mounting apparatus for 108
112 coupling device for 108
114 internal shock absorber
116 mounting apparatus for 114
118 TEFLON swivel ball socket It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved shock absorbing seat for a vehicle, with a frame having a seat tube which comprises:
   a) a seat assembly;
   b) absorbing means located between said seat assembly and the seat tube on the frame, for absorbing impulsive forces generated by the wheels making contact with an irregular road surface, so that the impulsive forces will be assimilated by said absorbing means before reaching said seat assembly to give a rider a softer and smoother ride;
   said seat assembly including:
      a seat post being slidably engaged with said seat tube;
      a support structure connected to an upper end of said seat post;
      a saddle that is carried on said support structure; and
      a padded cover to fit over said saddle; and said absorbing means including:
         a pair of external shock absorbers;
         mounting means for mounting said external shock absorbers to said seat tube on said frame; and
         coupling means for coupling said external shock absorbers to said seat assembly, so that said seat post can slide within said seat tube on said frame; and
      each said external shock absorber including:
         a cylindrical housing positioned vertically on said mounting means adjacent said seat tube;
         a lower disc-shaped retainer carried in said housing;
         a coil spring which sits upon said lower retainer;
         a telescopic shaft extending upwardly from the center of said lower retainer through said coil spring and above said housing;
         an upper disc-shaped retainer affixed to said telescopic shaft which fits over said coil spring; and
         a cone-shaped bellows cover which is attached between a top of said housing and said telescopic shaft, to protect said telescopic shaft from weather elements, such as snow, ice, rain and debris.

2. An improved shock absorbing seat as recited in claim 1, wherein said mounting means includes;
   a) a bracket clamp having a split lug, so that said bracket clamp can fit about the seat tube on the frame and support said external shock absorbers thereon; and
   b) a fastener extending through the split lug on said bracket clamp for securing said bracket clamp to the seat tube.

3. An improved shock absorbing seat as recited in claim 2, wherein said coupling means includes:
   a) an elongated rod extending transversely through the upper end of said seat post and said support structure in said seat assembly;
   b) a pair of eyelets, each formed on a top end of a respective one of said telescopic shafts; and
   c) a pair of bolts, each extending through one of said eyelets and threaded into an end of said elongated rod.

4. An improved shock absorbing seat as recited in claim 3, further including means for adjusting the distance of said lower disc-shaped retainer from said upper disc-shaped retainer to selectively vary the stroke action of said telescopic shaft with respect to said coil spring.

* * * * *